Figure 1:
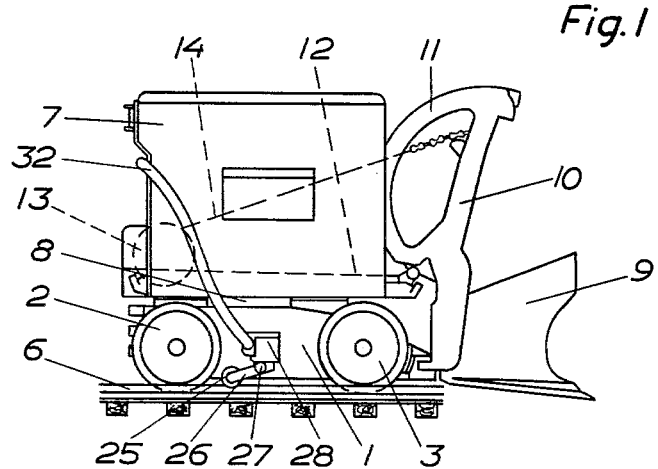

Dec. 14, 1965  H. J. YLINEN  3,223,261
MEANS FOR PREVENTING SHOVEL LOADERS FROM TIPPING
Filed Oct. 14, 1963  3 Sheets-Sheet 1

INVENTOR.
HEIKKI JALMARI YLINEN
BY
ATTORNEY

INVENTOR.
HEIKKI JALMARI YLINEN
BY
ATTORNEY

Dec. 14, 1965   H. J. YLINEN   3,223,261
MEANS FOR PREVENTING SHOVEL LOADERS FROM TIPPING
Filed Oct. 14, 1963   3 Sheets-Sheet 3

INVENTOR.
HEIKKI JALMARI YLINEN
BY
Greer Marechal Jr
ATTORNEY 3,223,261
MEANS FOR PREVENTING SHOVEL
LOADERS FROM TIPPING
Heikki Jahnari Ylinen, Lovskogen, Stallberg, Sweden
Filed Oct. 14, 1963, Ser. No. 315,812
Claims priority, application Sweden, Oct. 19, 1962,
11,210/62
7 Claims. (Cl. 214—132)

This invention relates to means for preventing tipping of shovel loaders or the like which are movable on four wheels on tracks. The invention is substantially characterized by the fact that between one front and one rear wheel at one side of the loader which has a tendency to lift from the track a feeler is disposed for contacting the track between the wheels and which is arranged to actuate directly or indirectly a motor disposed on the loader, which motor provides power which initiates tipping, the actuation comprising reduction of the power supply to the motor, when the loader starts tipping and the side lifts from the track. Accidents and tendencies to accidents caused by tipping of shovel loaders in mines and other rooms in rock have unfortunately occurred now and then. The risk that a shovel loader would turn over or tip is great when the shovel of the loader is swung far out to one side, or when the loader sticks in the rock pile or catches a part of the wall, or when the shovel is overloaded by trying to lift too heavy blocks, or the like. The present invention discloses a means which has proved very efficient in preventing tipping of such shovel loaders which are usually pneumatically driven but which may also be operated electrically or hydraulically. According to the invention the power supply to the motor of the loader which operates or actuates the shovel is reduced or interrupted as soon as one side of the loader starts to lift from the track on which the loader wheels move. In pneumatically operated loaders the means for preventing tipping may, in a relatively simple manner, be arranged so that a valve, which is provided in a supply conduit to the motor, interrupts the compressed air supply to the motor or vents the supply conduit. In hydraulically operated loaders the pressure liquid supply to the power cylinders operating the shovel may be reduced or by-passed, and in electrically operated loaders a current to the electrical shovel swinging motor may be interrupted or reduced.

In the accompanying drawings two embodiments of means for preventing tipping of compressed air operated shovel loaders are illustrated by way of example. These loaders are of the type which is provided with a shovel carried on rocker arms by means of which the shovel is movable from a digging or filling position in front of the loader to a discharge position in which the shovel discharges into a receptacle or a conveyor.

Figure 2:
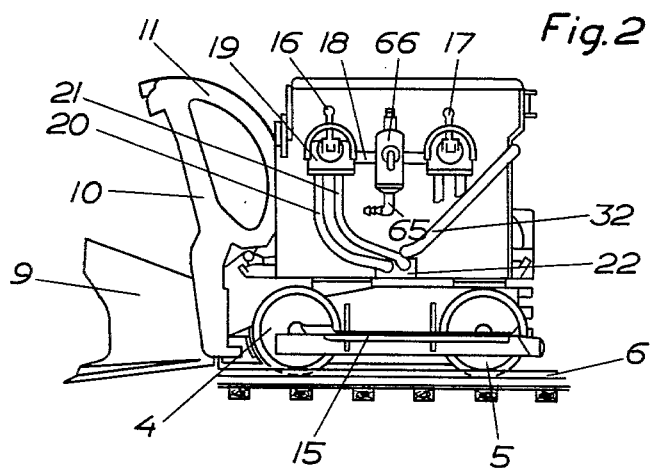
Figure 3:
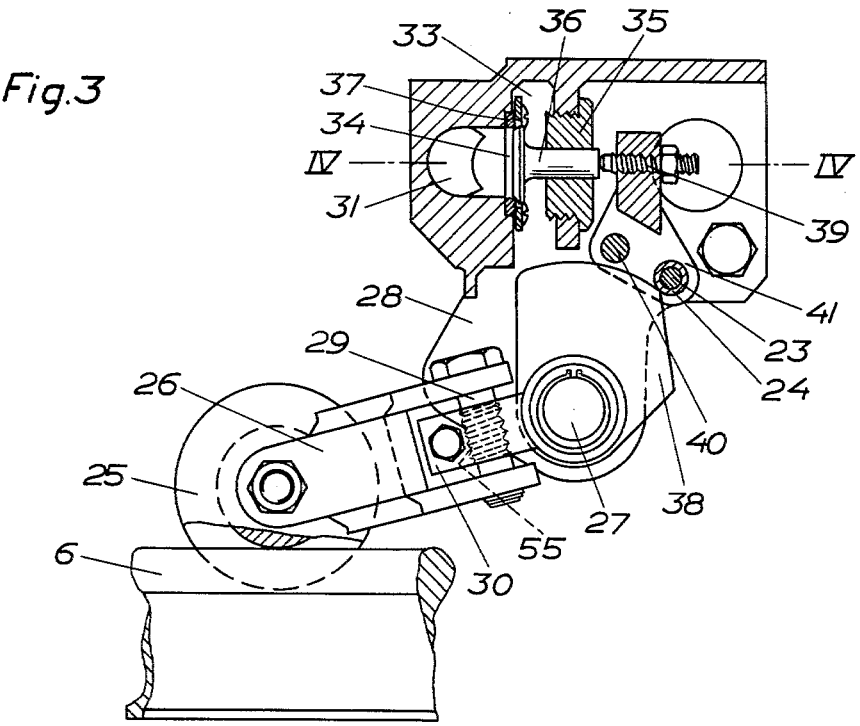
Figure 4:
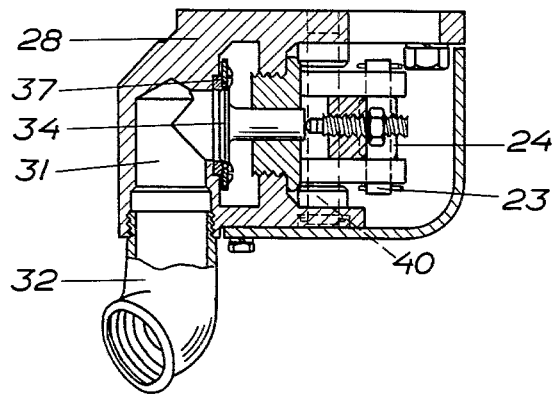
Figure 5:
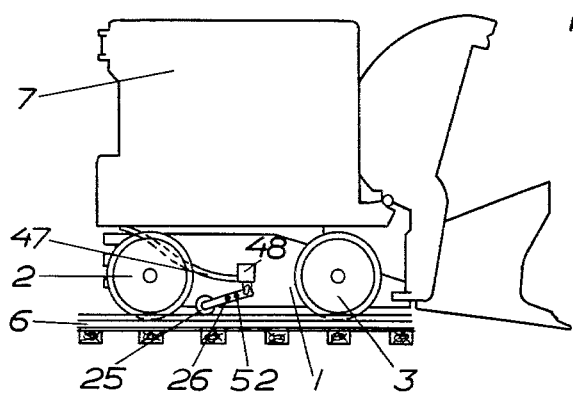
Figure 6:
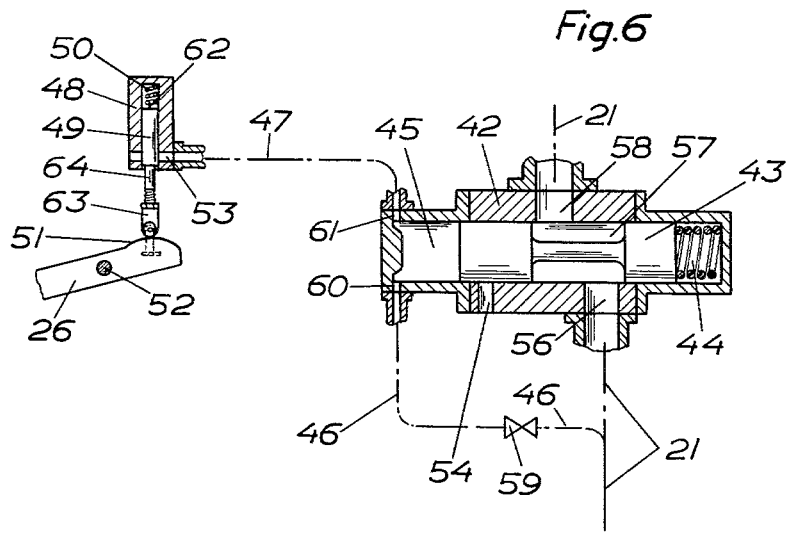

FIG. 1 is a side view of a loader of the type described illustrating the location of the tipping preventing means between the front and rear wheels of the loader at one side thereof. FIG. 2 is a side view of the opposite side of the loader where the operator has his place. FIG. 3 illustrates details of the tipping preventing means on a larger scale, and FIG. 4 is a section on line IV—IV in FIG. 3. FIGS. 5 and 6 show a modification of the invention.

The loader illustrated in FIGS. 1 and 2 consists of a lower frame or substructure 1 which is movable on four wheels 2, 3, 4, 5 on tracks 6. The substructure 1 in conventional manner carries an upper frame 7 which is swingable on the lower frame 1 on a vertical axis 8. A shovel 9 carried on rocker arms 10 is movable on the upper frame from a loading position, as illustrated in FIG. 1, to a raised discharge position and during this movement the shovel rolls with arcuate rocker members 11 formed on the arms 10 on rails 12 on the upper frame. The upper frame is furthermore provided with a compressed air driven shovel actuating motor 13 which by means of a chain 14 is connected to the arms 10 of the shovel for swinging the shovel. At the manoeuvring side of the loader a platform 15 for the operator is provided as well as two operating levers 16, 17 for manipulating the shovel actuating motor 13 and the not illustrated traction motor which drives the wheels 2–5. Compressed air is supplied to the loader through a hose connected to a nipple 65 and an oiler 66 and to the shovel actuating motor through a hose 18 via an operating valve 19, a hose 20 and a hose 21 which leads from the operating valve to a header 22 from which communication is provided to the motor 13. The arrangements described so far in connection with the loader are of conventional nature.

According to the invention a tipping prevention means is provided between the wheels 2 and 3 at the side of the loader opposite to the manoeuvring side. The tipping prevention means substantially consists of a feeler comprising a roller 25 which is rotatably mounted at one end of an arm 26 swingable on a trunnion 27 carried by a valve housing 28 secured to the lower frame of the loader. The arm 26 has a transverse hinge formed by a pivot 29 which connects the arm 26 to an arm 30 extending from a cam 38 mounted on the trunnion 27 and by this arragement the roller 25 is free to move sideways with regard to curves and irregularities in the track and simultaneously a possibility is obtained to adjust the cam 38 and the arm 26 one relative to the other since the pivot 29 is threaded along the portion 55 which connects it to the arm 30.

The valve housing 28 forms a chamber 31 which through a hose connection 32 is directly connected to the compressed air hose 21 between the operating valve 19 and the shovel actuating motor 13 and consequently the chamber 31 is supplied with compressed air as soon as compressed air is supplied to the shovel actuating motor. The chamber 31 may be connected with a chamber 33 communicating with the atmosphere over a valve 34 which is axially displaceable with its spindle 36 in a bushing 35 in the valve housing 28. The valve 34 is normally held against its seat 37 by the weight of the roller 25 and the arm 26 which through the cam 38 acts on a link 41 which is swingable on a pivot 40. The link 41 actuates the valve spindle 36 through an adjusting screw 39. The valve 34 is kept closed by the weight of the roller 25 and the arm 26 as long as the loader rests with the wheels 2–3 on the track 6. If during operation of the loader and shovel the loader should get a tendency to tip towards the manoeuvring side, i.e. over the operator, then one or both wheels 2–3 lift from the track 6. The roller 25 is then lowered relative to the loader so that the roller is still in contact with the track and during this down swing of the roller 25 the cam 38, the lever 41 and valve spindle 36 are actuated by the air pressure in the chamber 31 so that the valve 34 moves from its seat. Compressed air is then vented from the chamber 31 to the atmosphere which means that the shovel operating motor is vented more or less on the supply side. The tilting power of the shovel operating motor which tends to lift the shovel against too large a resistance is then reduced or disappears completely so that the shovel moves down towards loading position and the loader returns with the wheels 2, 3 on the track 6. During said last movement the roller 25 and arm 26 through the cam 38, the link 41 and the spindle 36 pushes the valve 34 towards its seat 37 so that venting of the shovel actuating motor is interrupted and compressed air again begins to actuate said motor. Naturally, the operator must then adjust the operating valve so the tendency to tilt or tip does not occur again. The tipping prevention means disclosed is consequently completely automatic in action and the loader as well as the shovel actuating motor are returned to normal operating condition as soon as the loader again rests on all four wheels.

The above described tipping prevention means may naturally be modified in several different ways within the scope of the claims. For instance, the feeler 25 may be arranged to actuate the compressed air supply to the shovel actuating motor indirectly. Such an arrangement is illustrated diagrammatically in FIGS. 5 and 6. The details in FIGS. 5 and 6 which correspond to equivalent parts in FIGS. 1–4 have been indicated with the same reference numerals as in said figures and are therefore not described again. In the arrangement according to FIGS. 5 and 6 the air hose 21 from the shovel motor operating valve to the shovel operating motor is connected to a valve housing 42 in which a piston slide valve member 43 is movable against the action of a spring 44. Said slide valve member normally keeps a passage open from a port 56 through an annular space 57 to a port 58 as soon as compressed air from the hose 21 is supplied to a chamber 45 in the valve housing over an operating conduit 46 which contains a throttle valve 59. The conduit 46 is branched off from the hose 21 and communicates with the chamber 45 through a port 60. A second port 61 communicating with the chamber 45 communicates with an operating conduit 47 and a port 53 in a pilot valve casing 48. A plunger type valve member 49 is movable in the pilot valve casing 48 against a spring 50 and is normally kept in closed position by said spring. In this position the plunger valve member 49 rests on a cam 51 at one end of the double armed lever 26 with an adjusting portion 63 which is screw threaded on the plunger 49 in order to permit adjustment. The double armed lever 26 is swingably mounted on a pivot 52 secured to the lower frame 1 and rests with the roller 25 on the track 6. As soon as the wheel 2 lifts from the track the end of the arm 26 is swung downwards and the plunger valve 49 is then displaced against the spring 50 until it starts to open a vent passage from the opening 53 in the valve housing 48 to the atmosphere through the space around a reduced portion 64 of the plunger valve 49. The reduction of the air pressure in the conduit 47 reduces the pressure in the chamber 45 so that the piston slide valve member 43 is displaced by the spring 44. The slide valve member then throttles or closes the air supply to the shovel operating motor by partially or totally closing the port 56 and simultaneously vents the hose 21 leading from the port 58 to the motor through the space 57 and the vent passage 54. As soon as the tendency to tip has discontinued and the wheel 2 is again down on the track 6 the plunger valve member 49 returns to closed position and pressure starts to build up again in the chamber 45 so that the piston slide valve member 43 opens the compressed air supply to the shovel actuating motor. The speed with which the above operations take place is dependent upon the adjustment of the throttle valve 59 in such a manner that the more the air passage through the throttle valve is restricted the faster is the response of the slide valve member 43 to a tilting tendency. Naturally it then also takes longer time for the chamber 45 to be filled with compressed air so that the resetting of the device takes more time.

The embodiments of the invention above described and illustrated in the drawings should only be considered as examples and may be modified in various different ways within the scope of the claims. For instance, in connection with loaders the wheels of which are running on self-laying endless tracks. The feeler way then be arranged to contact and to follow the ground engaging track for the two wheels. In connection with shovel loaders it has been found most efficient to provide the feeler just in front of the rear wheel at the opposite side of the loader to the manoeuvring place. Naturally, however, feelers may be provided at both sides of the loader if desired.

What I claim is:

1. In apparatus of the character described for preventing the tipping of a shovel loader because of improper loading of the shovel thereon and having a shovel loader disposed upon four wheels for the transportation thereof from place to place with a shovel disposed thereon movable from a digging to a discharge position and vice versa, and a source of power, the combination which comprises a shovel operating motor connected to said source of power and said shovel for the movement of said shovel from said digging position to said discharge position and vice versa, connecting means providing connection between said source and said motor, a feeler arm pivotally disposed on said loader on one side between a forward and a rear wheel thereof, said feeler arm having ground engaging means disposed thereon forming a feeler for engaging the ground between said forward and rear wheels and for pivotal movement on said arm toward the ground upon the raising of one or more said adjacent wheels from the ground, and means in said connecting means and connected to said feeler arm responsive to the pivoting action thereof for interrupting connection between said source and said motor upon the raising of said wheels from the ground and for reinstating connection upon return of said wheels to the ground.

2. Apparatus as described in claim 1 in which said motor is a pressure fluid operated motor, said connecting means provides flow communication from a source of pressure fluid to said pressure fluid operated motor, and in which said responsive means includes a valve movable selectively from an open position for exhausting said connecting means and interrupting flow communication between said source and said fluid operated motor and a fully closed position reinstating said flow communication, and in which said valve is connected to said feeler arm and movable in response to the pivoting movement thereof in response to tipping movement of the said shovel loader.

3. Apparatus as described in claim 2 in which said feeler comprises a roller disposed on said feeler arm for engaging the ground on one side of said shovel loader between a front and a rear wheel thereof.

4. Apparatus as described in claim 1 in which said responsive means includes a spring biased pressure fluid operated valve member disposed in said connecting means providing flow communication between said source and said motor and in which said source provides pressure fluid which pressure fluid flows in said connecting means for balancing of said spring means, and a pilot valve connected to said feeler arm and said pressure fluid operated valve member for actuating in response to pivoting movement of said feeler arm for exhausting the said pressure fluid valve on the side thereof balancing said spring means for causing said spring means to move said pressure fluid valve member to interrupt said connecting means and for interrupting said exhausting upon the return pivoting of said feeler arm.

5. Apparatus as recited in claim 4 in which said pressure fluid operated valve vents pressure fluid in the connecting means between the motor and the pressure fluid valve simultaneously upon interrupting flow communication in said connecting means.

6. In apparatus of the character described for installation upon mine loaders and like vehicles having an operating loading shovel disposed thereon for preventing said vehicles from tipping caused by improper loading of said shovels, and having an operating motor and a source of power therefor, the combination which comprises means for interrupting communication between said motor and said source of power, a feeler arm for pivoting movement in response to tipping of the said vehicle and effective to operate said interrupting means, said feeler arm comprising a roller disposed thereon for engaging the ground adjacent the side of said vehicle between the front and back wheels thereof, the weight of said roller causing said feeler arm to pivot toward the ground upon the raising of the adjacent wheels of said vehicle from the ground and effecting actuation of said interrupting means upon the tipping thereof and pivoting of the said feeler arm and for reinstating communication between said motor and said source of power when the wheels of said vehicle return to the ground.

7. In apparatus of the character described for preventing tipping of a shovel loader because of improper loading of the shovel thereon and having a movable shovel loader disposed upon ground-engaging means for the transportation thereof from place to place with a shovel disposed thereon and movable from a digging to a discharge position and vice versa, and a source of power, the combination which comprises a shovel operating motor in flow communication with said source of power and connected to said shovel for the movement thereof from said digging position to said discharge position and vice versa, connecting means providing flow communication between said source and said motor, a feeler arm pivotally disposed on said loader on one side thereof adjacent said ground engaging means, said feeler arm consisting of a roller disposed thereon forming a feeler for engaging the ground adjacent said ground engaging means and for pivotal movement on said arm toward the ground upon the raising of said adjacent loader ground engaging means from the ground, and means in said connecting means and connected to said feeler arm responsive to the pivoting action thereof for interrupting connection between said source and said motor upon the raising of said adjacent ground engaging means from the ground and for reinstating connection upon return of said ground engaging means to the ground.

References Cited by the Examiner
UNITED STATES PATENTS 2,332,522   10/1943   Maxson _____ 214—132

FOREIGN PATENTS 231,328   11/1960   Australia.

HUGO O. SCHULZ, *Primary Examiner.*